(12) United States Patent
Zimmeri et al.

(10) Patent No.: US 9,596,492 B2
(45) Date of Patent: Mar. 14, 2017

(54) EMBEDDED SYSTEM FOR VIDEO PROCESSING WITH HARDWARE MEANS

(71) Applicant: NOVOMATIC AG, Gumpoldskirchen (AT)

(72) Inventors: Martin Zimmeri, Gumpoldskirchen (AT); Thomas Schlögl, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 0 days.

(21) Appl. No.: 14/765,518

(22) PCT Filed: Feb. 3, 2014

(86) PCT No.: PCT/EP2014/052073
§ 371 (c)(1),
(2) Date: Aug. 3, 2015

(87) PCT Pub. No.: WO2014/118378
PCT Pub. Date: Aug. 7, 2014

(65) Prior Publication Data
US 2015/0373402 A1 Dec. 24, 2015

(30) Foreign Application Priority Data

Feb. 2, 2013 (EP) .................................. 13153777
Jan. 30, 2014 (WO) ................. PCT/EP2014/051861

(51) Int. Cl.
*H04N 5/445* (2011.01)
*H04N 7/167* (2011.01)
(Continued)

(52) U.S. Cl.
CPC ... *H04N 21/234309* (2013.01); *G06F 3/1423* (2013.01); *G09G 5/14* (2013.01);
(Continued)

(58) Field of Classification Search
CPC .... H04N 5/44543; H04N 5/50; H04N 7/1675; H04N 21/4622; H04N 21/84
See application file for complete search history.

(56) References Cited

U.S. PATENT DOCUMENTS

2008/0231544 A1   9/2008 Cooper et al.
2009/0079694 A1   3/2009 Day et al.
(Continued)

FOREIGN PATENT DOCUMENTS

EP        2247108 A1    11/2010

OTHER PUBLICATIONS

Anonymous: "FR Frame Series", Teracue, 2012, Seiten 1-2, XP002705217, Gefunden im Internet: URL:http://www.teracue.com/dirlist/download/02.Datasheets/07.Enclosures&Accessoires/FR_Datasheet-EN.pdf [gerfunden am Jul. 19, 2013] Seite 1.
(Continued)

*Primary Examiner* — Sumaiya A Chowdhury
(74) *Attorney, Agent, or Firm* — Avery N. Goldstein; Blue Filament Law PLLC

(57) ABSTRACT

An embedded system for video processing comprises hardware means for realizing the following functions:
  i) a server function, wherein for realizing the server function the following functions are realized:
    i1) receiving of at least one image-, at least one audio-data stream;
    i2) compression of at least one of the image- and audio-data streams yielding in each case a combined data stream respectively;
    i3) output of at least one of the combined data streams via a protocol based network;
  ii) a client function, wherein for realizing the client function the following functions are realized:
    ii1) receiving of at least one combined data stream from the protocol based network;
(Continued)

ii2) decompression of the at least one combined data stream;

ii3) output of the combined decompressed image- and audio-data stream;

iii) wherein the hardware means are designed in such a way that they compress and decompress a continuous combined data stream and iv) the hardware means for realizing the server function and the client function are arranged on a joint circuit board.

15 Claims, 12 Drawing Sheets

(51) Int. Cl.
| | |
|---|---|
| H04N 21/2343 | (2011.01) |
| H04N 21/214 | (2011.01) |
| H04N 21/41 | (2011.01) |
| H04N 21/414 | (2011.01) |
| H04N 21/418 | (2011.01) |
| H04N 21/4402 | (2011.01) |
| H04N 21/61 | (2011.01) |
| H04N 5/44 | (2011.01) |
| G06F 3/14 | (2006.01) |
| H04N 21/2365 | (2011.01) |
| H04N 21/2389 | (2011.01) |
| H04N 21/2665 | (2011.01) |
| H04N 21/434 | (2011.01) |
| H04N 21/4385 | (2011.01) |
| H04N 21/442 | (2011.01) |
| H04N 21/643 | (2011.01) |
| H04N 21/4363 | (2011.01) |
| G09G 5/14 | (2006.01) |

(52) U.S. Cl.
CPC ......... *H04N 5/4401* (2013.01); *H04N 21/214* (2013.01); *H04N 21/2143* (2013.01); *H04N 21/2365* (2013.01); *H04N 21/23895* (2013.01); *H04N 21/2665* (2013.01); *H04N 21/414* (2013.01); *H04N 21/4122* (2013.01); *H04N 21/4183* (2013.01); *H04N 21/41415* (2013.01); *H04N 21/4344* (2013.01); *H04N 21/4347* (2013.01); *H04N 21/43632* (2013.01); *H04N 21/43853* (2013.01); *H04N 21/4402* (2013.01); *H04N 21/4424* (2013.01); *H04N 21/440272* (2013.01); *H04N 21/6125* (2013.01); *H04N 21/64322* (2013.01); *G09G 2340/02* (2013.01); *G09G 2340/045* (2013.01); *G09G 2340/0492* (2013.01); *G09G 2370/022* (2013.01); *G09G 2370/12* (2013.01)

(56) References Cited

U.S. PATENT DOCUMENTS

2010/0149304 A1  6/2010  Chao et al.
2010/0332569 A1  12/2010  Bryant-Rich et al.

OTHER PUBLICATIONS

Anonymous: "ENC-300-HDSDI H.264 HD/SD Encoder", Teracue, Jul. 16, 2011, Seiten 1-2, XP002705218, Gefunden im Internet: URL:http://web.archive.org/web/20110716212124/http://www.teracue.com/index.php?option=com_content&view=article&id=114&Itemid=116&lang=en [gefunden am Jul. 19, 2013] das ganze Dokument.

Anonymous: "DEC-300-HDSDI", Teracue, 2012, Seiten 1-2, XP002705219, Gefunden im Internet: URL:http://www.heynen.com/ibc-2012-teracue [gefunden am Jul. 19, 2013] das ganze Dokument.

Anonymous: "Product activation", Online, Jan. 7, 2013, Seiten 1-2, XP002723309, Gefunden im Internet: URL:http://en.wikipedia.org/w/index.php?title=Product_activation&oldid=531825575 [gefunden am Apr. 14, 2014] Seite 1.

EMBEDDED SYSTEM FOR VIDEO PROCESSING WITH HARDWARE MEANS

The invention relates to an embedded system for video processing and a video distribution system. Such devices are particularly used for distribution of video data from more than one source to more than one display means (i.e. monitors). A typical area of application are betting agencies. Also further infotainment systems, for which different information or different data streams shall be directed to one or more monitors for joint output for simultaneous display, for instance displays at train stations, airports, in shopping malls etc., are areas of application.

In order to provide TV contents via an IP network, several possibilities are known. The distinction between IPTV and internet TV consists of the method of access. In the case of IPTV, a local network operator specific application performs content navigation, whereas in the case of internet TV a standard based browser is used to facilitate the navigation of the content. In both cases service video content is provided to a television set of a viewer or user via an internet connection.

The EP2247108A1 "Distributed TV access system" discloses an online application for navigation of broadcasts (broadcast signal, specifically round or television signals), which are transmitted via a network such as cable or satellite. A customer receives the broadcast signals via a first network connection and navigates the televisual contents by means of an online application via a second network. The first network connection and the second network connection may be two connections on the same network (i.e. two connections via two different software ports) or two connections in two different networks (i.e. the internet and a private TV network such as a cable-to-satellite TV network).

The object of the present invention is to provide a system of the abovementioned type, which is versatile. Particularly, by means of the proposed measures a high flexibility in the modes, the connections and resolutions is achieved, and a large variety of combinations in the processing of various broadcast signals and the provision of broadcast signals to the user is accomplished. Furthermore, a preferable scalability concerning the number of participants and the set-up of the system is realised and real time capability and security of the signal processing as well as the system is enabled.

This object is accomplished according to the present invention by the subject matter of the independent claims.

The dependent claims constitute preferred embodiments of the invention.

An embedded system for video processing comprising hardware means for realising the following functions:
i) a server function, wherein for realising the server function the following functions are realised:
  i1) receiving of at least one image-, at least one audio-data stream;
  i2) compression of at least one of the image- and audio-data streams yielding in each case a combined data stream respectively;
  i3) output of at least one of the combined data streams via a protocol based network;
ii) a client function, wherein for realising the client function the following functions are realised:
  ii1) receiving of at least one combined data stream from the protocol based network;
  ii2) decompression of the at least one combined data stream;
  ii3) output of the combined decompressed image- and audio-data stream;
iii) wherein the hardware means are designed in such a way that they compress and decompress a continuous combined data stream and
iv) the hardware means for realising the server function and the client function are arranged on a joint circuit board.

The hardware means are designed in such a way that they can compress or decompress a continuous image- and audio-data stream with at least 24 frames per second, preferably at least 25 frames per second, more preferably at least 50 frames per second, and most preferably at least 60 frames per second, without data jam.

Because the hardware means for realising the server function and the client function are arranged on a common circuit board, a compact architecture is achieved. For user-friendly handling, the joint circuit board is designed as a PC plug-in card and is displayable in a PC operating system environment as a network card.

In a preferred embodiment, the system possesses a) hardware means for accepting more than one combined data stream via the protocol based network;
b) hardware means for decompression of more than one combined data stream;
c) hardware means for scaling and/or rotating and/or merging and/or cross-fading of more than one decompressed image and audio data stream; d) hardware means for common output of more than one decompressed image and audio data stream for simultaneous display on a monitor; and
e) hardware means for separate output of one or more combined data streams on at least two monitors, which are arranged as a video wall.

Thereby, in addition to the usual display of a video data stream to a monitor, it is possible—by scaling means in arbitrary size—to achieve a series of further display modes, for example two simultaneous streams with selectable size and positioning can be displayed, or a stream is displayed cross-faded over a second one, or four different streams are displayed simultaneously, or three streams are displayable simultaneously on a 90° rotated screen, or six streams are displayable on one monitor (one large, five small), or, for example, a video wall with four or nine monitors can be configured.

An abundance of information, such as i.e. dynamic live betting odds and dynamic live result services can be displayed in real time, and game statistics, parallel TV live broadcasts of several sports events etc. can be clearly edited and displayed, in order to cover the information content on the one hand, and achieve an optimal entertainment experience on the other hand. Thereby, the streams can be arranged in any order on one or several monitors.

Preferably, the hardware means are designed such that they
a. conduct an individual security by means of a hardware serial number and an individual activation code, and
b. comprise activation code monitoring means, which conduct a monitoring and comparison of activation codes.

By means of the activation code and the activation code monitoring means a relatively high security against product piracy is achieved. Advantageously, the activation code monitoring means are adapted to emit an activation code warning signal or an activation code approval signal.

Preferably, the hardware means are designed in such a way, that they can compress or decompress a continuous image- and audio-data stream with at least 60 frames per second and a resolution of at least 1920×1080 pixels without data jam. Thus, the embedded system is able to process data streams in "full HD" resolution. It is self-evident that a resolution of 1280×720 is also possible.

Moreover, it is beneficial if the compression of data streams is carried out according to the H.264- or the H.265-standard. Thereby, an especially high compression rate for video data streams is accomplished, such that the necessary bandwidth for data transmission via the network can be kept as low as possible. The support of other compression standards, such as for example MPEG-2, can be provided alternatively or additionally.

According to a preferable development
a. the server function realises a function for encryption of the combined data stream; and
b. the client function realises a function for decrypting the at least one combined data stream.

This encryption and decryption is carried out in real time with hardware means, preferably according to the AES encryption method ("advanced encryption standard"), preferably using a key length of at least 256 bit. Thereby the data can be protected from attackers in the transmission path between server and client.

Furthermore, it is advantageous if the embedded system according to the present invention possesses hardware means for converting an image data stream, which has been recorded by interlaced scanning, into progressive video scanning. Thereby, it is possible to generate a progressive video data stream in real time and in high quality, even if the video source merely provides material, which has been recorded by interlaced scanning (interlaced).

According to a preferable development the embedded system according to the invention possesses
  a) a storage module with a BIOS;
  b) a storage module with an operating system; as well as
  c) means for receiving control signals via the protocol based network.

Thereby it is achieved that the embedded system according to the invention is able to operate independently from other devices ("standalone"), and particularly does not have to be connected to a computer for operation. However, the embedded system can be controlled via the protocol based network, for example regarding the choice of sources of the data streams and the desired transmission format (Server), or for example regarding the choice of the data streams to be displayed and the display mode (Client).

A further preferable development of the embedded system according to the invention possesses means for output of control signals for remote control of connected devices. Thereby, the connected devices, such as satellite television receivers (Server) or monitors (Client), may be also operated by remote control via the embedded system without requirement of additional remote control units. In doing so, depending on the kind of device to be operated by remote control, the control signals can be outputted via a possibly available infrared interface or via a possibly available HDMI output or also via the network. Due to the fact that the control signals can be transmitted via the network to the embedded system, it is also possible to operate the connected devices over longer distances and, if applicable, over structural barriers. Thereby, the operation can be carried out locally for individual or also central for all embedded systems according to the invention connected to the network. For convenient remote control, the connected devices are representable on a display device, for example a personal computer or a tablet computer, and selection menus are allocated to the representations in order to select or define display formats, and/or to allocate a specific data stream of a specific server to a client. It is also possible to display a visualised infrared remote control in order to adjust monitor specific properties in an easily ascertainable fashion for the user. The representation of the infrared remote control may correspond to a known remote control for the control of a television set.

It is also preferable if the embedded system possesses
a) hardware means for intermediate storage and repeated output of the at least one combined data stream; and
b) means for interactive control of the embedded system by the observer of the at least one outputted data stream.

It is also preferable if the embedded system possesses hardware means for improving the image quality of the image data stream, which provide the following functions: a) changing the brightness and/or b) changing the contrast and/or c) changing the image sharpness and/or d) noise suppression and/or e) colour corrections and/or f) reduction of artefacts and/or g) applying further filters.

Thereby improvements of the image data stream to be displayed can be achieved for the observer in real time. For example, the hardware means may be represented on a graphical user interface, and may be controlled by means of allocated selection menus, wherein a user is able to withdraw information about an adjustment from the client, that is the display device, and/or from a representation on the graphical user interface. Alternatively, the hardware means can be automatically adjustable, for example on the basis of available measurement data as well as comparison data for optimising the actual data of the data stream to be changed.

A further preferred embodiment of the embedded system according to the invention is characterised in that the hardware means comprise a FPGA (Field Programmable Gate Array), wherein the following functions are provided by the FPGA: a) connection to the protocol based network; b) firewall; c) encryption of the combined data stream to be output, if the embedded system operates as a server; and d) decryption of the at least one combined data stream, if the embedded system operates as a client.

Thereby the firewall allows filtering of IP, Port, and Mac addresses via a rule table. An adjustable logging function of the firewall allows recording of valid and/or invalid access attempts on the embedded system. Optionally, unlocked Ports/IPs/Mac addresses can be blocked automatically after a certain amount of failed attempts or an alarm can be triggered, if too many not permitted accesses on the embedded system per unit of time occur.

The FPGA contains in addition a 256 bit AES encryption unit, which is able to encrypt or decrypt the incoming and outgoing network data in real time. By this realisation of the embedded system a network security, as high as possible, is accomplished.

Furthermore, it is preferable if the configuration of the FPGA is individually encrypted. Thereby, a security against product piracy is achieved, given that possibly retrieved configuration data of a FPGA of an embedded system according to the present invention cannot be used for configuration of a different embedded system of that kind. To this end, the individual hardware serial number and/or the individual access code can be used.

A further preferable development of the embedded system according to the present invention is characterised in that the hardware means comprise a DSP (digital signal processor), wherein the following functions are provided by the DSP:
  a) compression of at least one of the image- and audio-data streams yielding in each case a combined data stream, if the embedded system operates as a server;
  b) decompression of the at least one combined data stream, if the embedded system operates as a client; and
  c) scaling and output of the decompressed image- and audio-data stream via an interface, if the embedded system operates as a client.

By choosing a suitable DSP an especially high performance during the processing of video data is achieved by this realisation of the embedded system, which ensures the real time capability of the embedded system.

It is preferable if the embedded system according to the present invention possesses a) at least one network connection, and b) at least one interface to a data bus and/or c) at least one interface according to a video standard, and/or d) at least one interface according to an audio standard, and/or e) an infrared interface.

The network connection is, in this case, absolutely required, the further interfaces or connections, respectively, are optional. For example, these may comprise HDMI interfaces, preferably a connection for data input from a video source and one for data output to a monitor, and/or a PAL interface, and/or an additional stereo audio interface, and/or a USB interface, and/or an infrared interface for operating the connected video source or the connected monitor by remote control.

It is further favourable, if the protocol based network, to which the embedded system according to the present invention is connected, comprises a transmission capacity of at least 100 Mbit per second. Preferably, the network is a Gigabit-Ethernet-Network, namely a network, which uses the ethernet protocol and has a transmission capacity of at least 1000 Mbit per second.

Moreover, a video distribution system for receiving and distributing of at least one video data stream from at least one video source is proposed, with a) a protocol based network;
b) at least one embedded system described above, which operates as a server and receiving, compresses and outputs via the protocol based network at least one of the image data streams from the at least one video source; and
c) at least one embedded system described above, which operates as a client and receives from the protocol based network at least one compressed data stream, which is decompressed and outputted via an interface.

Such a video distribution system is, due to its modular set-up and the properties of the used embedded systems, very versatile and nearly arbitrary scalable and/or extendible.

It is preferable if regarding the video distribution system according to the present invention a) satellite television receivers or cable television connections or DVBT receivers or PCs or media players are deployed as video sources; and
b) to the interfaces of the embedded systems, which are operating as a client, by which the data streams are outputted, monitors are connected.

Furthermore, a video distribution system for receiving and distributing at least one video data stream from at least one video source is proposed, having a) a protocol based network;
b) at least one embedded system, which operates as a server and receives, compresses, and outputs via the protocol based network at least one of the image data streams from the at least one video source, and
c) at least one embedded system, which operates as a client and receives at least one compressed data stream from the protocol based network, which is decompressed and outputted via an interface.

All the preferable realizations and developments may also be chosen for the embedded system of said video distribution system, which are described further above for the embedded systems.

A control PC is connected to a network, which comprises image and/or audio data streams, and a display device for representing at least one selectable monitor, wherein the control PC comprises at least one input device and, wherein by means of a selection menu, which is displayable on the display device a. the monitor can be switched on or off, and/or
b. the data streams to be displayed on the monitors are selectable, and/or
c. a position of images on at least one monitor is selectable or adjustable, and/or
d. a display format is selectable, and/or
e. a representation of a remote control unit with several switches is displayable, wherein functions of the monitor are switchable by means of the switch of the remote control unit.

By means of the graphical user interface all monitors in the system or network can be controlled not only with respect to their adjustment, but also with respect to the contents to be displayed, by a respective allocation of the data streams with the video/audio data, for example TV channels. Furthermore, a selection and allocation of information data, for example in the form of a so-called news ticker, browser URL, that is internet pages, and/or image data, is conveniently possible. Obviously, also data streams of several monitors, which are arranged as a video wall, can be assembled individually. By means of the graphical user interface, standard settings or user settings can be saved and/or loaded. A up-to-date arrangement and assignment of the monitors in a selected network is automatically displayed on the display device. Accordingly, the actually present monitors are visualised and easily selectable by a user. If a visualised monitor is selected, the user may open the allocated selection menu, for example by means of a mouse click, a keyboard command, or touching a sensor field if the display device is designed as a touch screen. The selection menu displays only those menu items (that is control commands), which are executable at the respective monitor or the monitor assembly in the form of the video wall. The control PC may also be a tablet computer or a similar device. In the visualisation, all the adjustments made are displayed, such that they are immediately perceivable by the observer. The arrangement of visualisation of the available monitors may occur in a user specific fashion or according to a predetermined and saved standard or specification. During the installation of monitors respective data regarding the position in a room, their adjustability and addressing and, if applicable, a representation of a specific remote control, are saved and are subsequently available in the network and, therefore, also for visualisation. Concerning a video wall, which also facilitates an overlaid display of so-called windows with different contents, the video wall as well as the windows are visualised on the display device. The contents, that are the data streams, are selectable, and the single windows within the video wall are perceivable as images by the user and freely arrangeable. Each window can be positioned arbitrarily and the arrangement can be saved in a retrievable fashion. Therefore, the observer of the video wall sees for example a large background image, on which two or more further images, also overlapping with each other in sections or merging, are arranged. These images, which are visualised as windows on the display device, may also be scaled in size by means of the input device.

Further details and features can be derived from the following description of preferred embodiments in conjunction with the dependent claims. In that regard the respective features may be realized individually or several in combination with each other. The possibilities for solving the problem are not restricted to the embodiments. For example, area specifications always comprise all—not explicitly named—intermediate values and all possible sub-intervals.

It goes without saying that the features named above and to be described below are not only applicable in the respective specified combination, but also in other combinations. The scope of the invention is only defined by the claims.

Hereafter, the invention is illustrated further based on examples referring to the respective Figures.

It is shown in

FIG. 1 the schematic set-up of an embodiments of the video distribution system according to the present invention for application in a betting agency;

FIG. 2 the set-up of a simple embodiment of the video distribution system according to the present invention;

FIG. 3 a more complex embodiment of the video distribution system according to the present invention;

FIG. 4 the schematic set-up of an embedded system according to the present invention;

FIG. 5 the schematic set-up of an embedded system according to the present invention with a server functionality;

FIG. 6 the schematic set-up of an embedded system according to the present invention with a client functionality;

FIG. 7 an illustration of an embedded system according to the present invention as a module;

FIG. 8 a schematic representation of the video data processing of an embedded system according to the present invention running as a server;

FIG. 9 a schematic representation of the video data processing of an embedded system according to the present invention operating as a client; and FIG. 10 a selection of display modes attainable with an embedded system according to the present invention operating as a client; and FIG. 11 a software-technological set-up of a branch; and FIG. 12 a schematic representation of the network security module; and FIG. 13 a schematic representation of the driver decoupling of a VideoWizard module in a PC operating system environment; and FIG. 14 an application of the system according to the present invention as a roulette transmission within a casino; and FIG. 15 an application of the system as a live game transmission outside of a casino; and FIG. 16 a schematic representation of the security of the network transmission; and FIG. 17 a schematic overview of the communication structure of the software units, and FIG. 18 a schematic representation of a user interface of a display device; and FIG. 19 a schematic partial representation of a single unit XIX according to FIG. 19 in an alternative embodiment; and FIG. 20 a schematic partial representation of a single unit XIX according to FIG. 19 in a further alternative embodiment.

The invention comprises a modern video distribution system on the basis of network based multiple H.264 data streams. Thereby, different video sources are converted into H.265 data streams by embedded systems operating as a server and decoded by embedded systems operating as a client and displayed on monitors.

The application of the video distribution system is intended for example for betting agencies, where the image sources are normally provided by satellite receivers and are individually distributed to the available TV monitors by shop masters/users.

The typical set-up of a video distribution system according to the present invention in a betting agency is depicted in FIG. 1 and consists of the four functional units receiving, distribution, display, and control. The receiving function is realised by a variable number of satellite receivers 100, which possess allocated embedded systems 110, which are operating as a server. The encoded video streams of the satellite receivers 100 are distributed via a network 120 (with a switch/distributer, VLAN). The display occurs via a variable number of monitors 130, which receive their images from allocated embedded systems 140, which are operating as a client, wherein the clients 140 individually provide from the supply of the receiver servers 110 selected image data streams.

Thereby, the selection of the image data streams occurs at local control PCs 150, at which the shop master/user can dynamically create the allocation between satellite program and monitor 130 (control). To this end, the TV monitors 130 and the satellite receivers 100 are visualised graphically on a display device 155, which is allocated to the control PC 150, as shown for example in FIG. 18.

Each embedded system 110 or 140, which is connected to a Sat-receiver 100 or TV monitor 130, additionally possesses an infrared control function, which allows to remotely operating the allocated device. Every satellite receiver 100 is also optionally connected to a network connection, via which the satellite channel listings can be updated and changed.

The control of the embedded systems 110 or 140 and, therefore, the allocated devices 100 or 130 occurs physically via network 120 and structurally via the operator PC software. If necessary, several such operator stations 150 allow the control of the devices 100, 130.

According to a preferred embodiment, the system according to the present invention constitutes Flexible hardware based multi-function video gaming and visualization system for digital television and digital media content, combination of a freely selectable global hardware based video stream network with game visualisations and interactive live content display.

According to a preferred embodiment, the system according to the present invention is arbitrary scalable by modular set-up (see also FIG. 2 or FIG. 3). A client can access several hundred server streams. The only limitation is the capacity of the used network.

According to a preferred embodiment, a division in clients and servers occurs. Servers receive image data and feed them into the network. Clients receive the network streams and display them in very different manners. Interactive control via network (for example PC, IPad, network compatible device). Mixed use as client and server simultaneously is possible.

According to a preferred embodiment, the system according to the present invention processes different sources, which can be fed via satellite or network locally or remotely (globally worldwide!) (live cams, digital and analogue TV sources, hard disk, magnetic disk data, media player etc.).

According to a preferred embodiment, the system according to the present invention is designed for receiving of the image source and real time encoding according to H.264-methods in hardware (data reduction for sending via network).

According to a preferred embodiment, the system according to the present invention is designed of several H.264 source data streams per client module.

According to a preferred embodiment, the system according to the present invention is able to provide different visualisation modes by the client (see also FIG. 10): a) 1 stream; b) 2 simultaneous streams; c) 4 simultaneous streams per TV; d) 3 rotated streams; e) 6 streams etc.; f) video wall mode, wherein one or several streams can be distributed onto a wall consisting of many monitors; g) cross-fading mode of different streams (blue box); h) Fading/cross-fading of live streams in game application; i) interactive control of the mode by the user; j) replay function of video streams on demand.

According to a preferred embodiment, encryption and decryption of data streams occurs in real time in hardware.

According to a preferred embodiment, the system provides an interactive possibility to show video contents anew or to change data streams and display modes interactively.

According to a preferred embodiment, transfer via network and distribution via switch system (i.e. gigabit, Ethernet, UDP protocol etc.) occurs.

According to a preferred embodiment, the system is set-up using combined FPGA and DSP/special chip technology (real time hardware).

The basic concept of the video distribution system and the embedded systems for video processing is depicted schematically in FIG. 2 and is based on two functional units in combination: the H.264 video functions for compression and decompression and the functions for network security with hardware firewall and real time data encryption.

H.264 Video Unit

The video unit of the embedded system consists of one or several H.264 encoders, which can compress image data in real time using the state of the art H.264 method, and one or several H.264-decoders, which can decode and display several compressed image data streams simultaneously. Image and sound data are received via a camera system or a HDMI/PAL source with up to 60 frames per second and transmitted to an embedded system, which is operating as a server, and which processes, records, and compresses these data to a H.264 data format. The image data streams can then either be transferred uncompressed to a PC or a monitor or can be transmitted via a network connection. This is depicted schematically in FIG. 9.

GigE vision compatible cameras 210, satellite receivers with HDMI output, DVD players or other devices adapted for HDMI output serve as image data source.

The embedded system additionally possesses the opposite functionality (client). It is possible to feed H.264 as well as MPEG2 data streams, which are decompressed in this embedded system in real time and can either be recoded or directly outputted via HDMI. This is depicted schematically in FIG. 10. Thereby, it is possible to play videos in progressive and interlaced data format (interlaced scanning) and to deinterlace them as required.

FIG. 10.1a, 10.2a shows a single video data stream, which is displayed scaled and positioned on a display (LCD, LED, OLED, TV etc. monitor) and underlayed with a background colour.

FIG. 10.1b, 10.2b shows two single video data streams, which are scaled and positioned and underlayed with a background colour. One of the two videos is scaled smaller and is in the foreground.

The whole system is constructed in such a way that only a single type of embedded system (VideoWizard module) is required physically. This embedded system is designed for security with respect to the data streams, but also with respect to product piracy.

Figure 1:
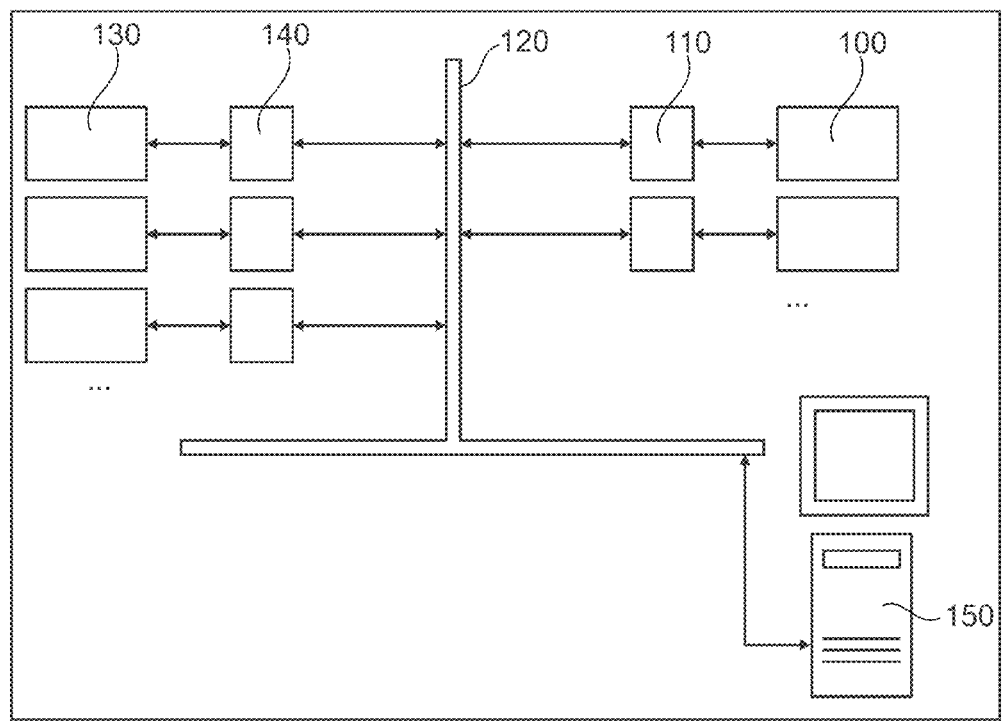
Figure 2:
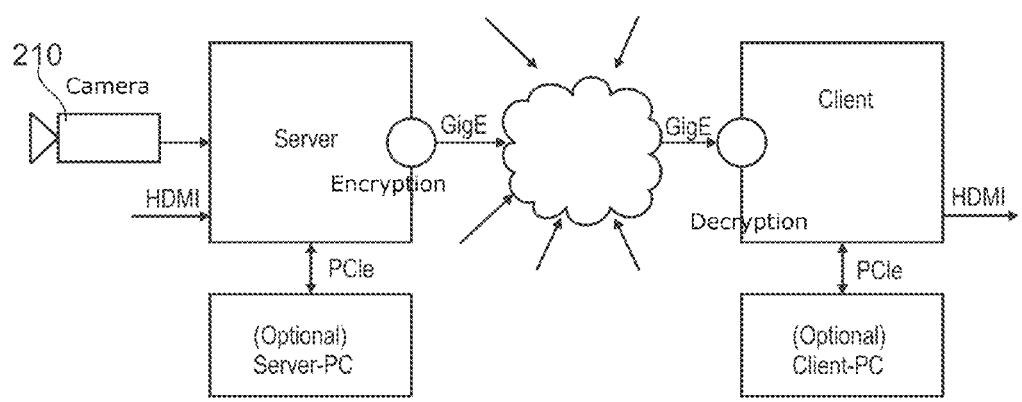
Figure 3:
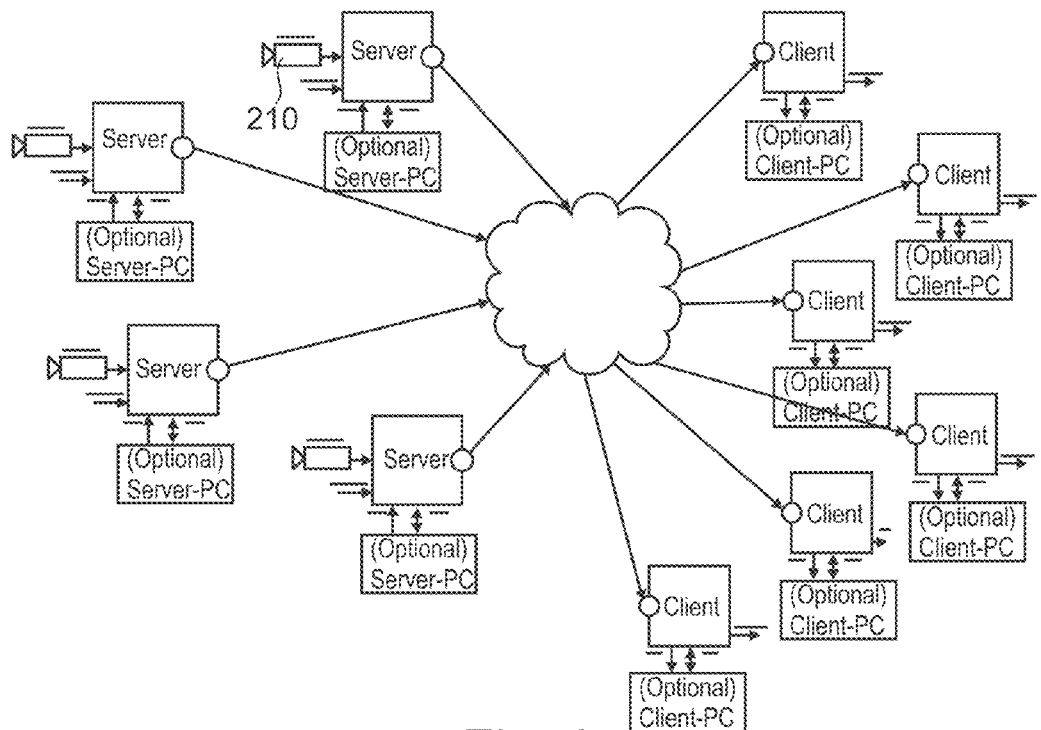
Figure 4:
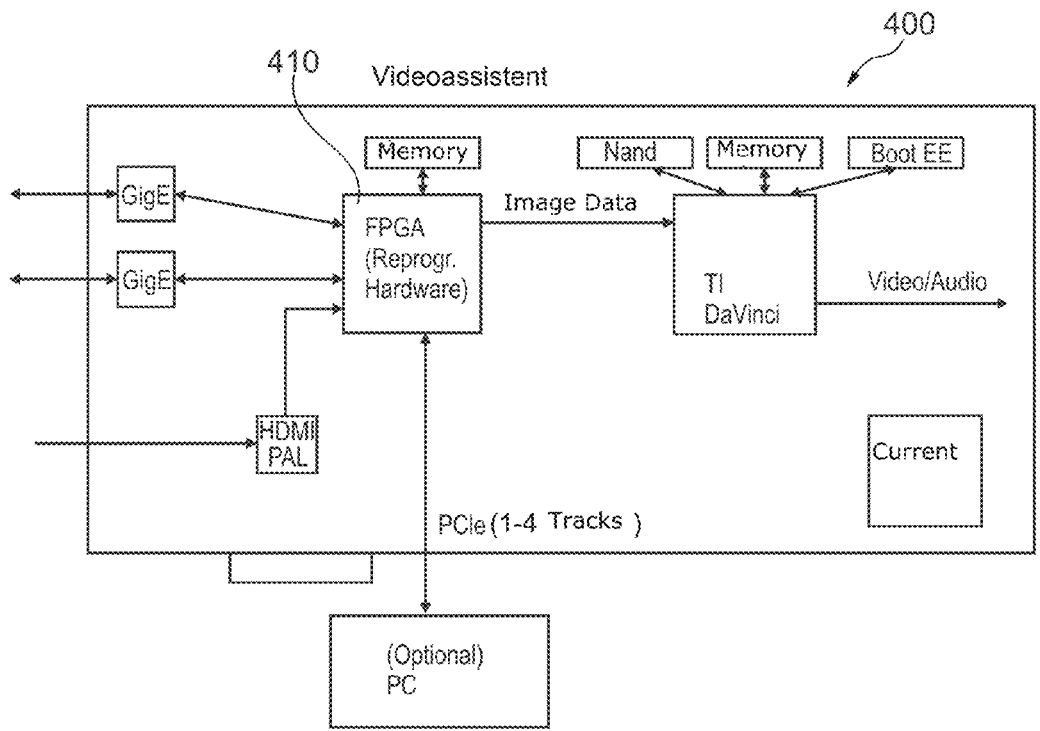

Thereby, the video distribution system is devised in such a way that systems with over 100 servers and clients can be realised in a single gigabit network stream (this is dependent on the resolution of the data streams). Alternatively the data stream can be cascaded in a tree like fashion. A system with many components is schematically depicted in FIG. 3.

The second simultaneous functionality of the embedded system consists of a network security functionality, which massively increases data transmission security via a hardware implemented firewall and AES real time data encryption. Thereby, the core functions in the present case are a 256 bit AES encryption of the network traffic as well as a hardware firewall with port activation and logging function.

General Set-Up of the Embedded System:

Conceptually, the embedded system 400 consists of a single component or a module ("VideoWizard hardware"), which is supplemented by a motherboard 710, which contains the additional functions for standalone operation.

Functionally, the module is able to realise the server functions, the client functions, and the network security functions. These are described in more detail below.

Figure 8:
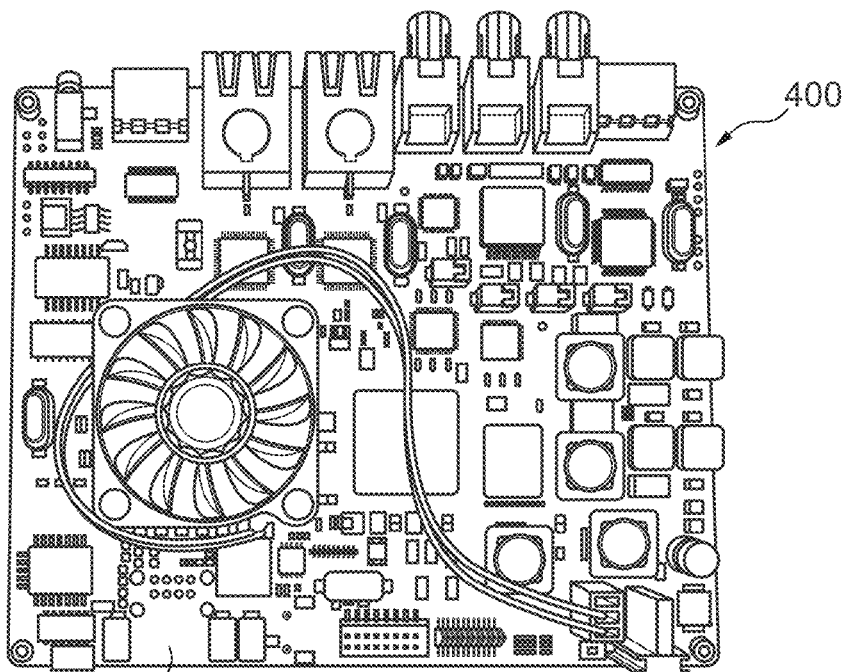
Figure 9:
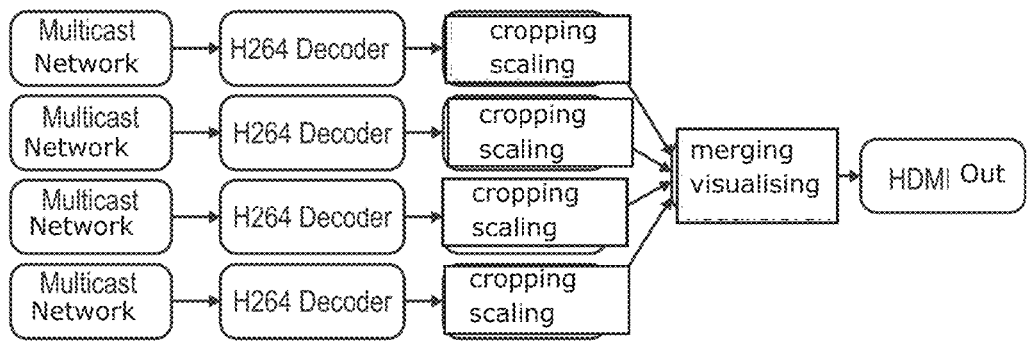
Figure 10C:
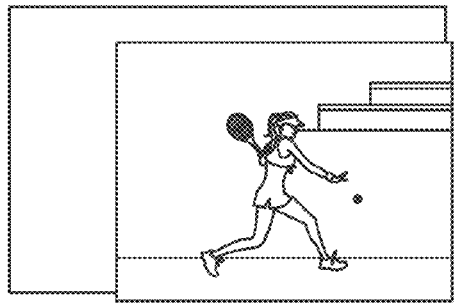
FIG. 10c shows two separate video data streams, which are both scaled and positioned and underplayed with a background colour. One of the two videos is scaled smaller and shown in a blending with the other video (blending).
Figure 10C:
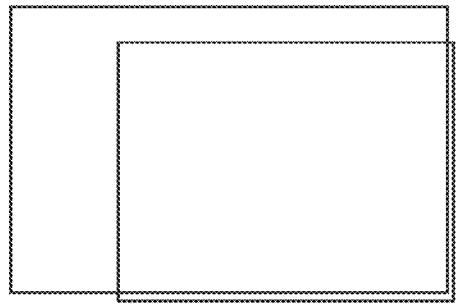
Figure 10C:
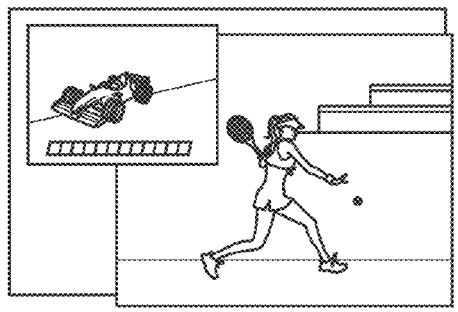
Figure 10C:
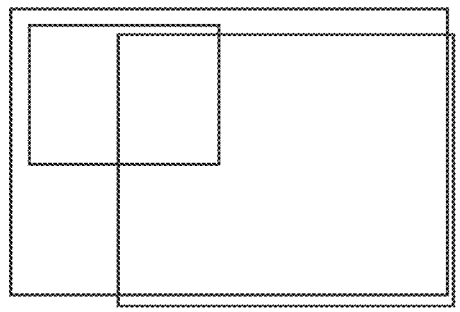
Figure 10C:
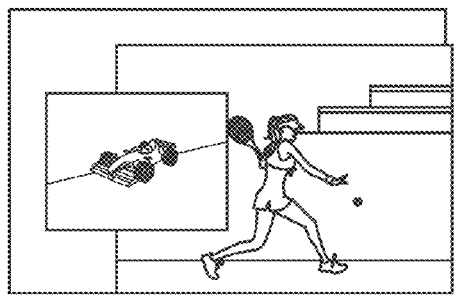
Figure 10C:
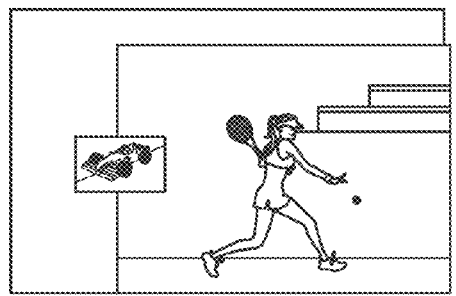
Figure 10D:
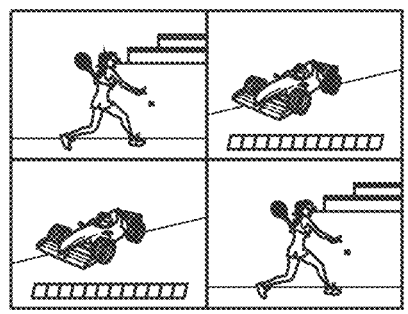
FIG. 10d shows four separate video data streams, all four of which are scaled and in a fixed position (non-overlapping).
Figure 10F:
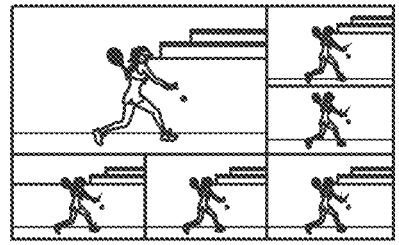
FIG. 10f shows six separate video data streams, all six of which are scaled and have a fixed position (non-overlapping).
Figure 10E:
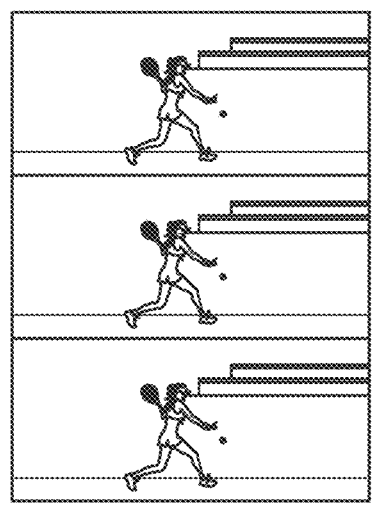
FIG. 10e shows three separate video data streams, all three of which are scaled and rotated by 90°, and in a fixed position (non-overlapping).
Figure 10G:
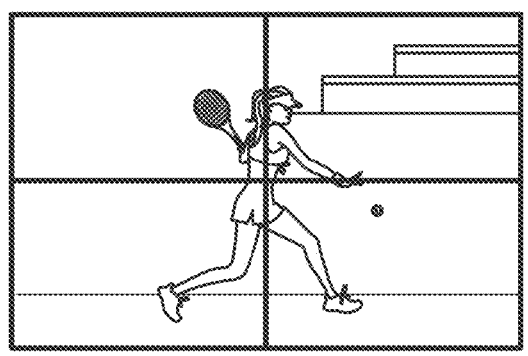
FIG. 10g shows a video data stream on a Video Wall realised with 4 monitors, wherein each of the 4 monitors displays a respective section of the complete image to be shown.
Figure 10H:
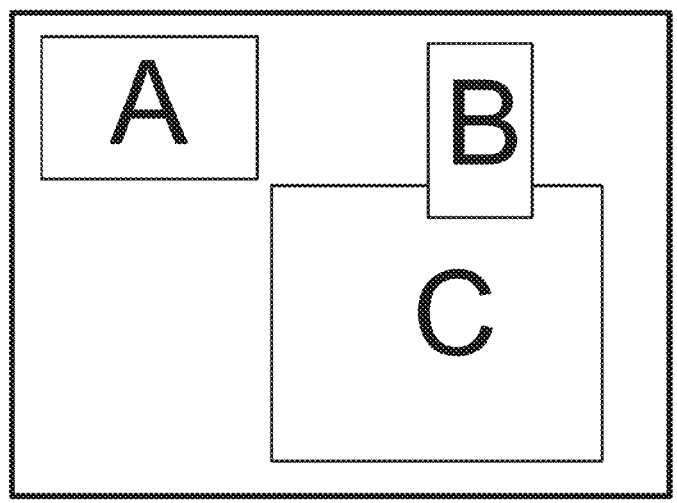
FIG. 10h shows three data streams, wherein video data streams as well as the HTML browser data streams are displayed mixed in different windows. The windows are to be arranged scalable, positionable, rotating (rotatable), and overlapping with each other.
Figure 10I:
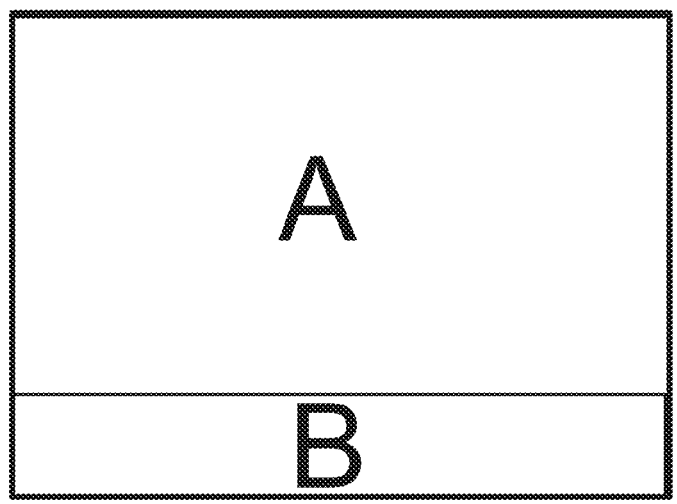
FIG. 10i shows two video data streams in different windows, wherein a larger window displays an image, i.e. from a satellite receiver, and a smaller window shows an information string, for example a so-called news ticker.
Figure 11:
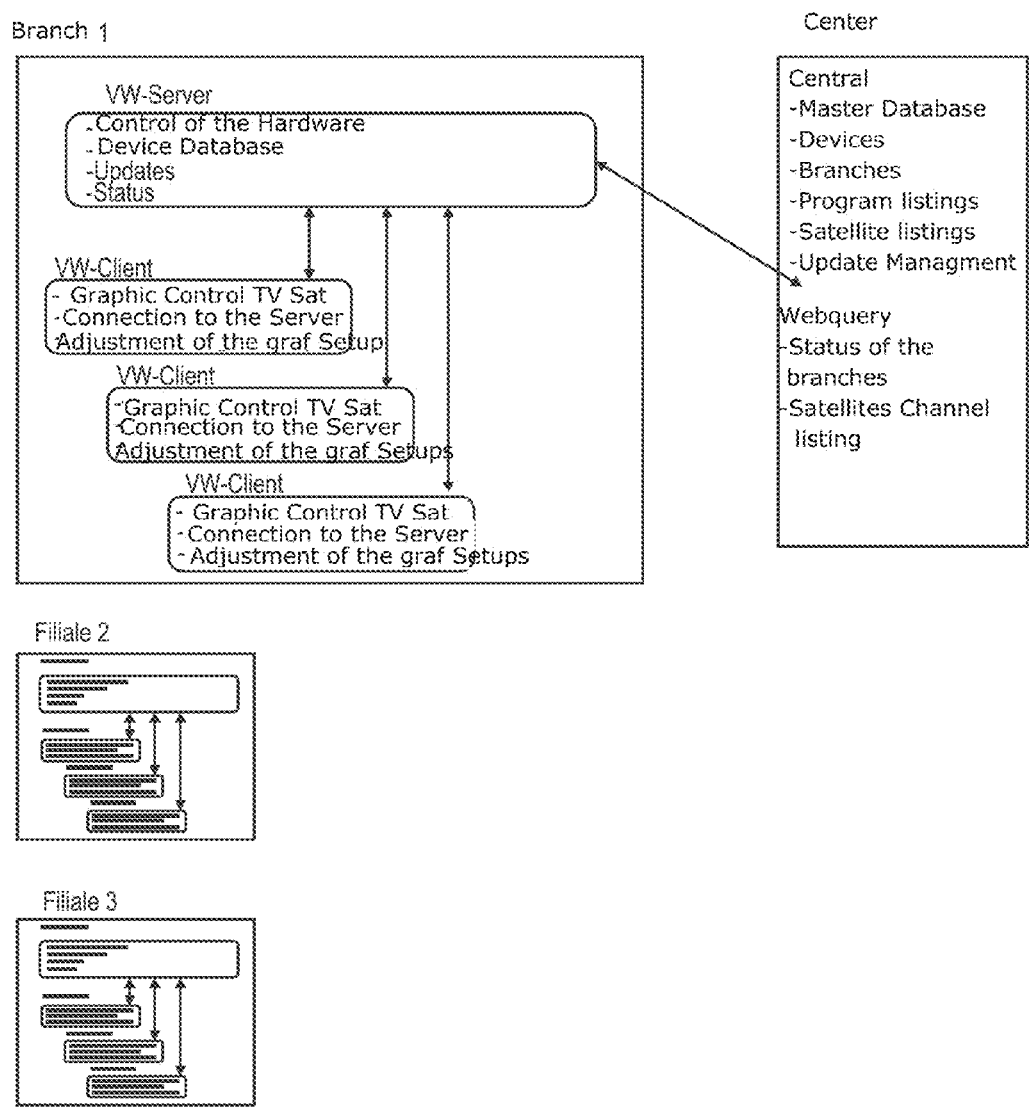

By setup, the embedded system (see FIG. 5 and FIG. 8) consists of a combination of FPGA and embedded processor, GPU and special hardware technology (all three functions in the utilised DSP). Thereby, both units share different functions. The functionality of the FPGA 410 is necessary for real time computing and processing of the GigE data of the camera 210, the processing of HDMI input data, and particularly PC connection and security aspects, the DSP realises the DVI output and scaling as well as the H.264 data processing as an encoder/decoder.

Advantageously, a driver decoupling of the VideoWizard modules (for example for different operating systems such as Windows XP Embedded and Linux) is possible by means of the embedded system, wherein the VideoWizard module, which is designed as a PC plugin card, is faded into the operating system environment as a network card. Thereby, the connection is a network driver, which allows the use of all standardised network programmes of the operation system. The second access interface is realised via a low level user library, which provides the necessary control, image generating and DMA functions. The FPGA can provide network functions in combination with the TI co-processor. For example, an image data and control driver 133 is provided in conjunction with a so-called application-programming interface API 134 as well as a separate network driver 135 (compare FIG. 13 and FIG. 12).

Figure 18:
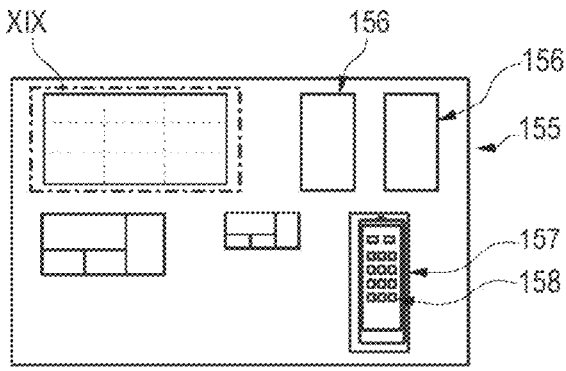

The display device 155, which is allocated to the control PC 150 according to FIG. 18, depicts a graphical user interface for visualisation of the available monitors 156, and/or windows 157, and/or a remote control unit 158. By means of selection menus 154 the monitors 156 can be switched on or off, the data streams to be displayed on the on monitors 156 or in the windows 157, which represent screen sections, can be selected, a display format can be selected, and the display size can be defined. The data streams to be selected individually may comprise video data, information data, for example in the form of a so-called news ticker, browser URL, that is Internet pages, and/or image data. By means of the graphical user interface it is also possible to save and/or load standard settings and/or user settings.

Figure 19:
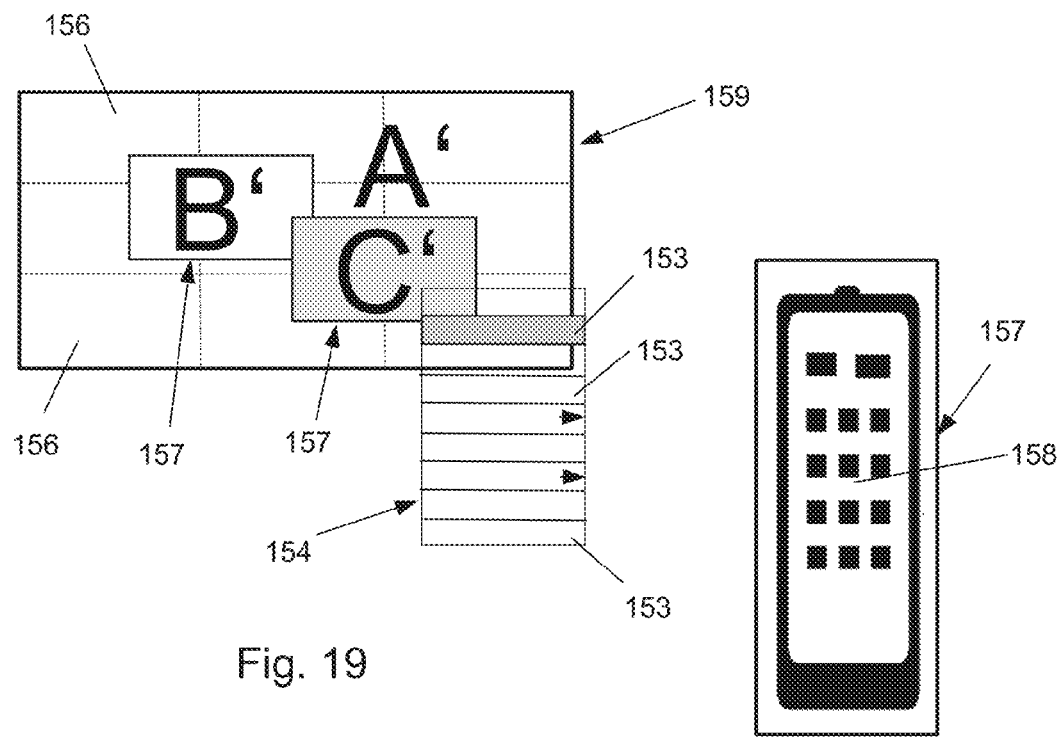

According to FIG. 19 a large-scale image A', which is visualised on the display device 155, is displayed on several monitors, which are assembled to a video wall 159, which is partially overlapping with two windows 157, which display the images B' and C', wherein the window 157 with the image C' partially overlaps with the window 157 with the image B'. In order to make adjustments concerning the window 157 with the image C', the window 157 is selected by means of an input device, for example a mouse, which is allocated to the control PC 150 and the display device 155, as depicted by the grey background, and the selection menu 154, which is allocated to the window 157, with different menu items 153, is expanded visually perceptible. After the selection of the menu item 153, depicted in grey, the allocated remote control unit 158 appears, with whose switches adjustments are to be made, or sent to the respective monitors or clients by means of especially adjusted commands. Obviously, the display device 155 may be designed as a touch screen, whereby the operation by a user can be very easily realised.

The representation of configurations, particularly the visualised assembly and sizes of the monitors 156 or windows 157 on the display device 155, corresponds to the actual assembly of monitors or is defined by means of a specified image. Previously saved configurations can be selected under a respective menu item 153, which can also be displayed in a title bar on the display device 155. By means of the input device, a selection menu with the representation of all available clients can be displayed.

The following types of contents can be defined in the visualisation of the display device 155:
  image: An image defined by the user is displayed. Images stored on an image server in a specific directory can be selected.
  info display: All available channels in the info display system can be selected.
  TV channels: Modules recognised as a server can be selected as TV channels.
  Browser URL: Any URL can be selected in this menu, however browser support on the modules can be restricted, i.e. no flash contents displayed.

With the menu item 153 "distribution" in XML format defined layouts may be allocated, which are available dynamically, meaning that possible layouts are only displayed for the present monitor or group of monitors.

Description of a XML Configuration:
Layout <Layout id="xxxxxxxx-xxxx-xxxx-xxxx-xxxxxxxxxxxx" xmlns="urn:admiral:absolutevision:light:layout:v1">
xxx . . . corresponds to a GUID, which is unique in the directory The file name of the configuration should also comply with this GUID.

GUID can be created by a GUID generator. i.e.: http://www.guidgenerator.com/online-guid-generator.aspx GUID (or UUID) is an acronym for "Globally Unique Identifier" (or "Universal Unique Identifier). It can be a 128-Bit integer for identifying resources.

The name entry is used by the system, therefore a name, which describes the distribution, should be entered.
<Name>Split 2/PictureInPicture</Name>

Under translations the name of the distribution is entered, which is displayed in the GUI. The translation according to the Windows system language is displayed. If there is no entry for the selected system language, the translation en is displayed.
<Translations>
<Translation language="de">2 Anzeigen/Bild in Bild</Translation>
<Translation language="en">2 Views/Picture in Picture</Translation>
</Translations>

<Screens> describes how the monitors or screens are arranged in the coordinate system, their resolution, and the rotation.
<Screens>
<Screen x="0" y="0" width="1920" height="1080" rotation="0"></Screen>
<Screen x="0" y="1080" width="1920" height="1080" rotation="0"></Screen>
</Screens>

Thereby, all monitors or screens, which are comprised in the distribution, should be entered. x="0" y="0" describe the position of the monitor/screen in the coordinate system of the video wall. Thereby, for instance the upper left point of the display can be used as a reference for positioning.

For example width="1920" height="1080" describe the size of the display.

rotation="0" describes the orientation, namely rotation of the display. For instance, only the values 0°, 90°, 180° und 270° can be supported. Currently, only 0 und 90 make sense, because only horizontal and vertical orientations can be selected in device settings.

<Contents> defines the viewing areas in the coordinate system. These areas can span several monitors.
<Contents>
<Content x="0" y="0" width="1920" height="1080"></Content>
<Content x="200" y="200" width="640" height="480"></Content>
</Contents> x="0" y="0" correspond to the starting coordinates of the content area in the coordinate system. For example, the upper left point can be used as a reference for positioning width="1920" height="1080" describe the size of the viewing area. If a content, which does not correspond to the indicated aspect ratio, is allocated to the content window, the content is adapted to the content area and scaled.

Figure 20:
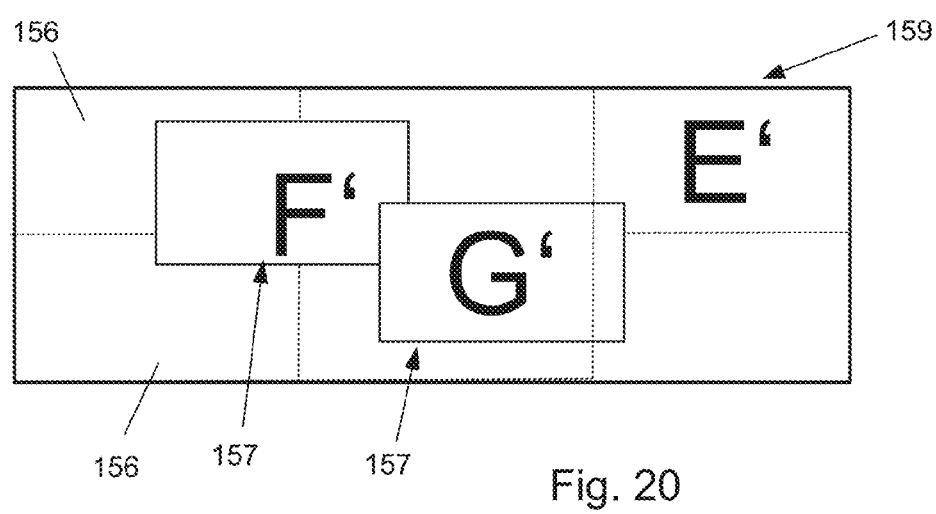

Example according to FIG. 20:
A video wall 159 consists of six FullHD TVs (3×2) and three viewing areas E', F', G':
  Viewing area E': Content over the whole wall of 3×2 TVs
  Viewing area F': Content over a partial area of 4 TVs. The display overlaps with viewing area E'

Viewing area G': Content over a partial area of 4 TVs. The display overlaps with viewing area E' and a part of viewing area F.

An accordingly constructed XML configuration file can for instance be transmitted to the client modules via an API interface.

Server Functionality

Figure 5:
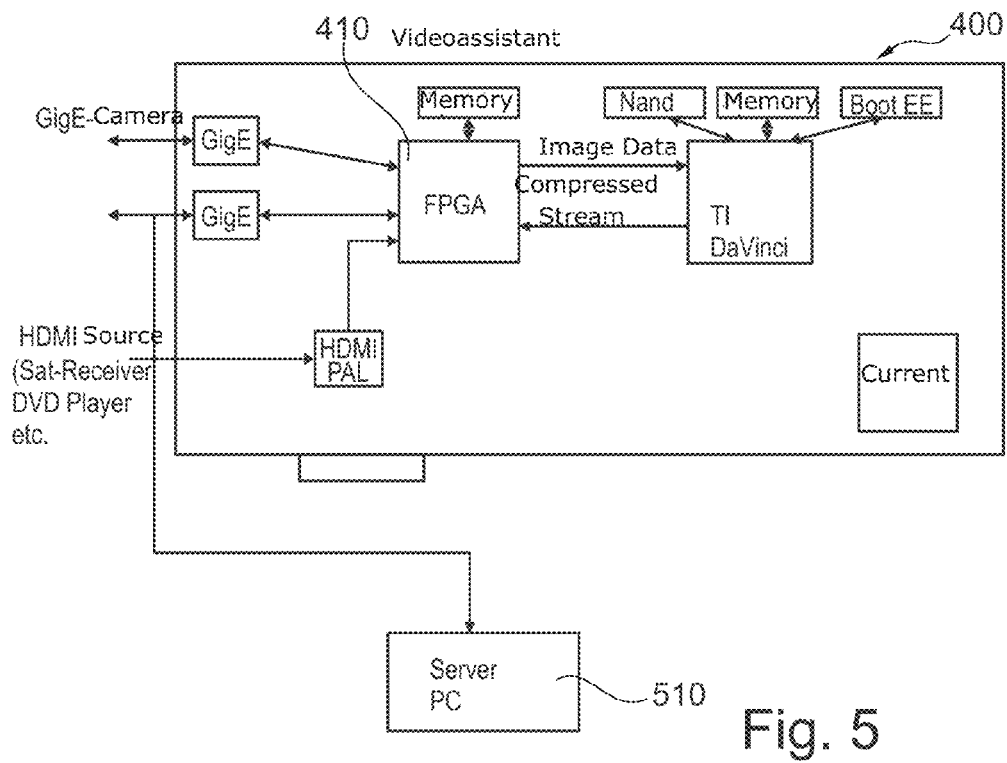
Figure 6:
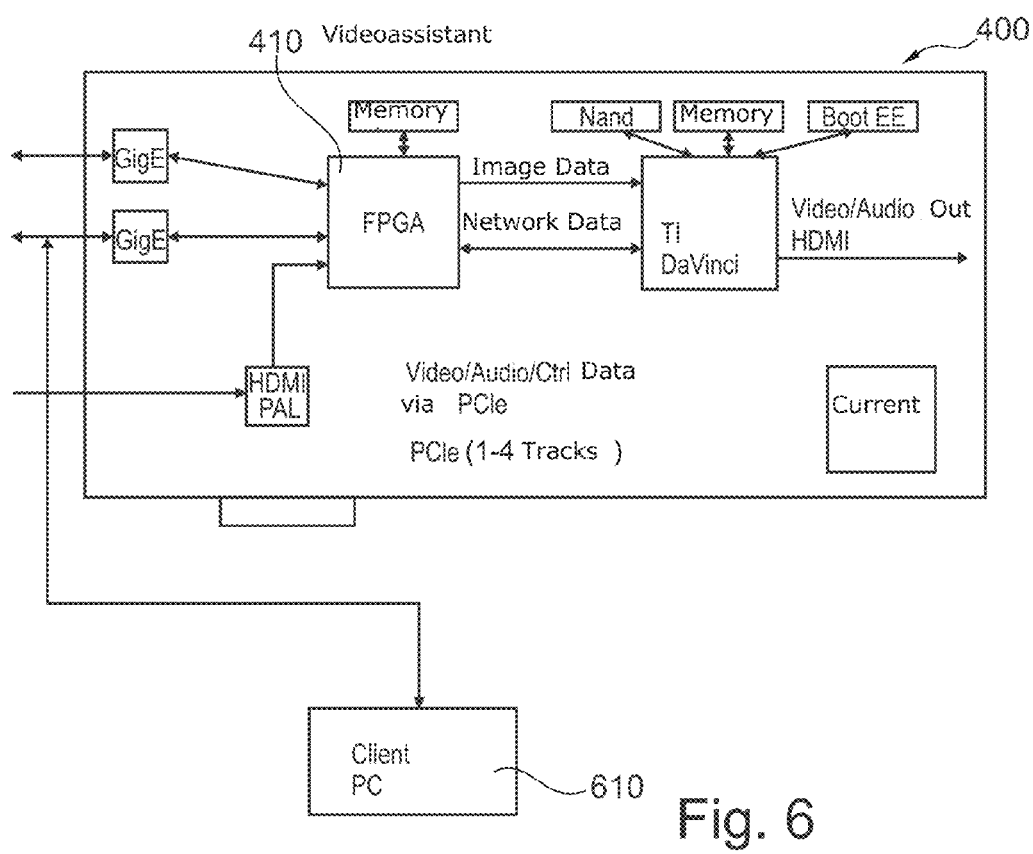
Figure 7:
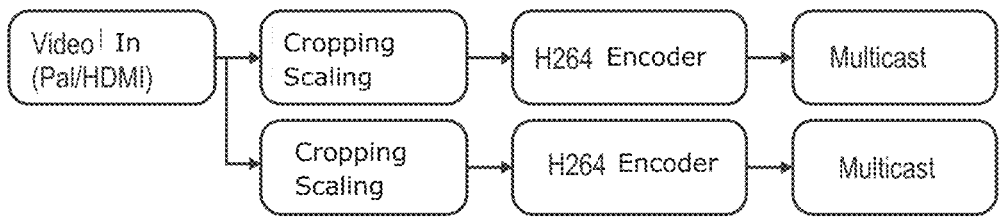
Figure 12:
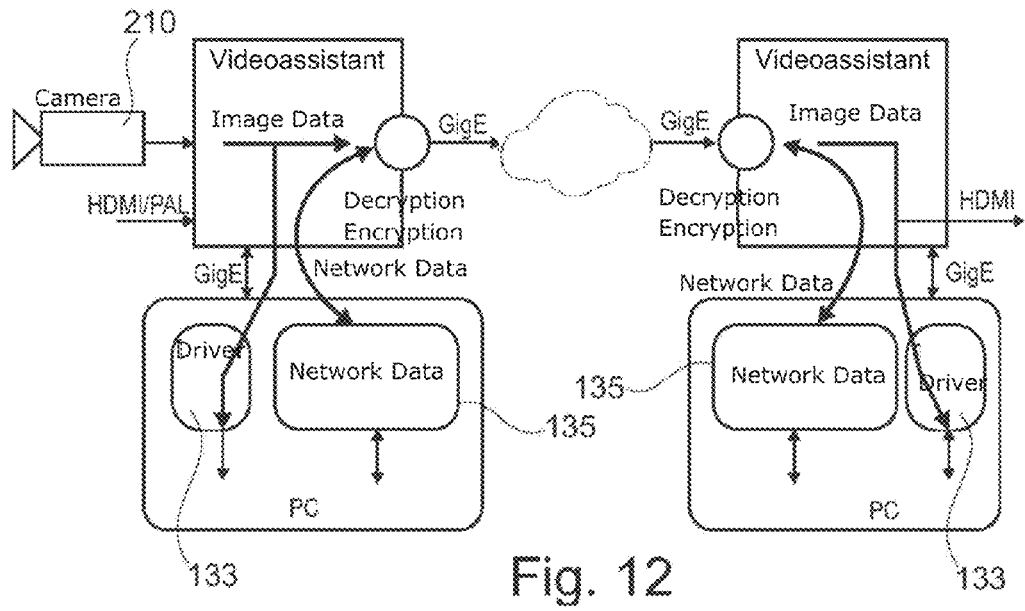
Figure 17:
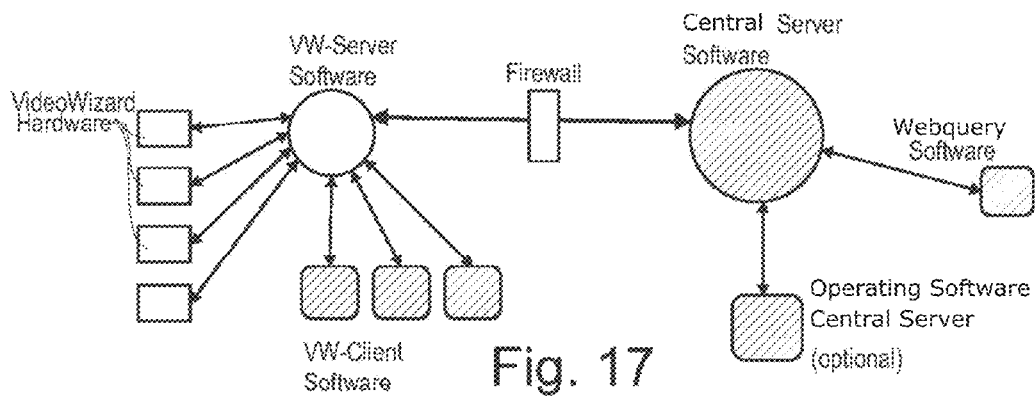

The server functionality of the embedded system is depicted schematically in FIG. 5 and partially in FIG. 12 (left of the network) and consists of the following detail functions:

- receiving of HDMI data streams up to 1920×1080 p60 (progressive, 60 Hz) or camera data streams;
- compression of the image- and audio-data streams in H.264 format;
- packaging of control and audio data into the H.264 data stream;
- standalone capability with access (via server PC 510) via Gigabit-Ethernet to internal registers of the embedded system;
- individual FPGA security against product piracy;
- AES encryption of the data stream;
- sending the compressed data via GigE network Client Functionality The client functionality of the embedded system is depicted schematically in FIG. 6 as well as partially in FIG. 12 (right of the network) and consists of the following detail functions:

- receiving of the compressed data or a data stream, respectively, via GigE network;
- AES decryption of the data stream;
- decompression of the image- and audio-data from the H.264 format or extraction of the control data from the data stream, respectively;
- decompression of the MPEG2 image data streams where applicable;
- deinterlace function with high quality for realisation of progressive image material;
- image scaling;
- restoration of an image data stream with 60 frames per second from the H.264 data streams;
- standalone capability with access (via client PC 610) via Gigabit-Ethernet to internal registers of the embedded system;
- individual FPGA security against product piracy;
- output of video audio and control data;

The embedded system (the VideoWizard) can preferably be utilised in combined modes. For example, a mix of client and server (with a selection of partial functions) or a recoding of several input data stream to new output streams is possible.

Network Function (Firewall and Data Encryption)

Figure 13:
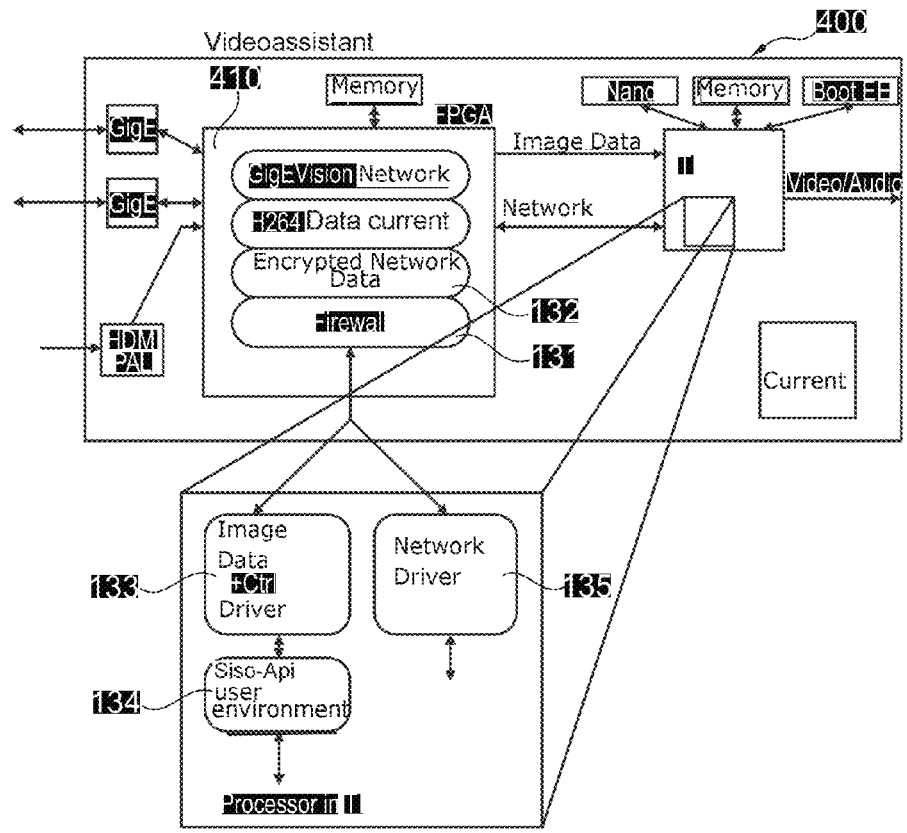
Figure 14:
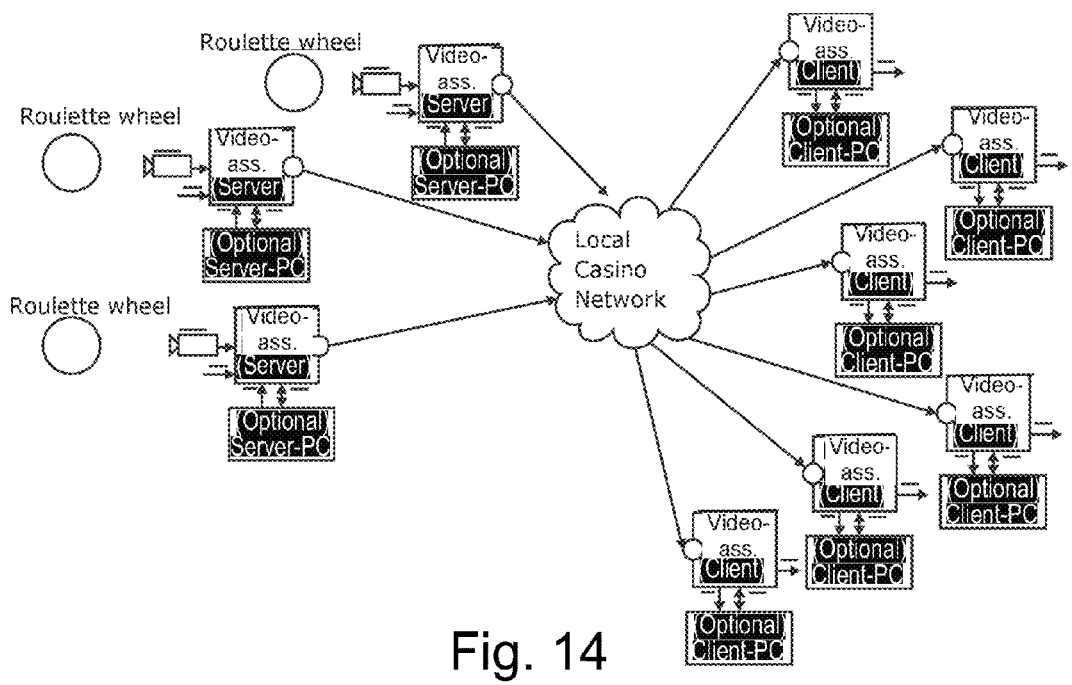
Figure 15:
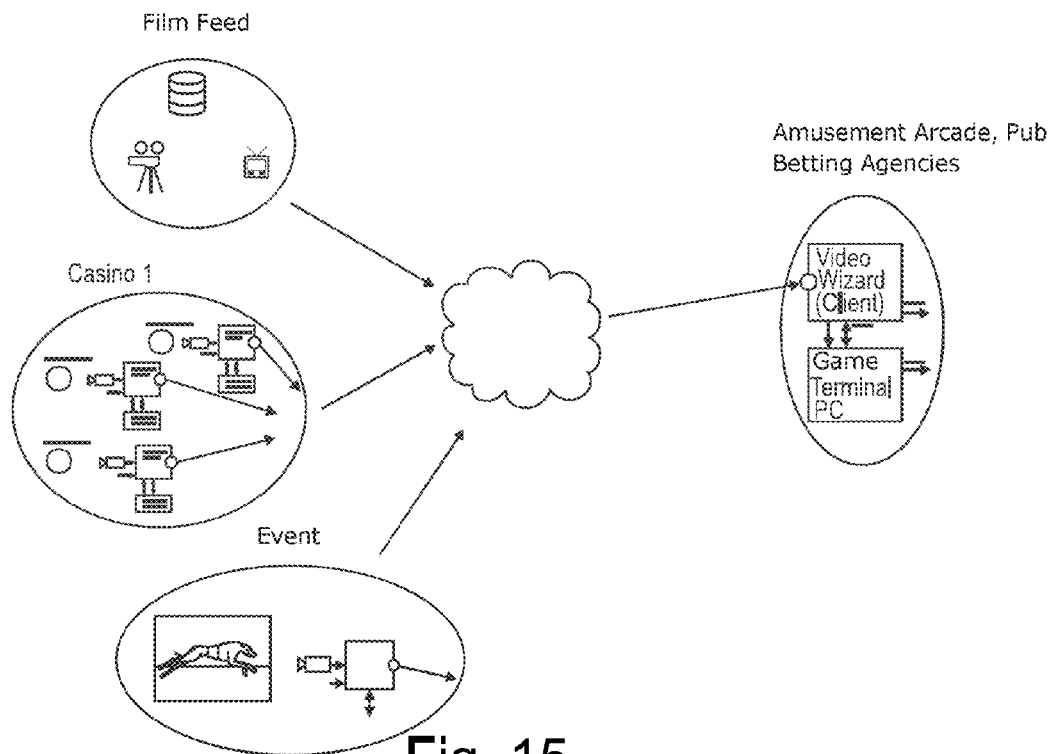
Figure 16:
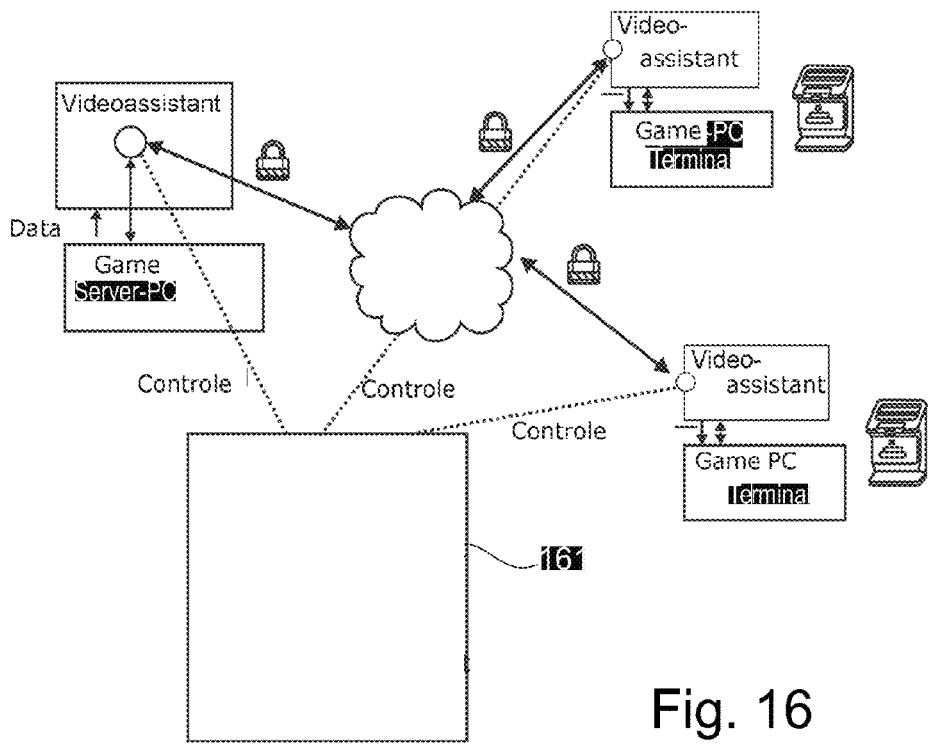

The network functionality of the embedded system consists of a hardware implemented firewall and AES real time data encryption, whereby the data transmission security is massively increased. Thereby, the core functions in the present case are a 256 bit AES encryption of the network traffic and a hardware firewall 131 with port activation and logging function. In detail the FPGA 410 predominantly realises the network functions (FIG. 13). Thereby, the FPGA contains a 256 bit AES real time encryption unit 132, which encrypts or decrypts, respectively, the incoming and outgoing network data. It is possible to choose between different H.264 data streams, which are transmitted into/out of the embedded system via network. The firewall 131 allows filtering of IP, port, and Mac addresses via a rule table. An adjustable logging function of the firewall 131 allows recording of the valid/invalid access attempts onto the embedded system. Optionally unlocked ports/IPs/Mac addresses can be blocked automatically after a certain amount of failed attempts or an alarm can be triggered if too many unallowed accesses to the embedded system occur per second. Regarding this matter, failed attempt monitoring means, which monitor the occurrence of failed attempts exceeding a defined threshold, are provided in the system.

Security Against Product Piracy

By means of an individual hardware serial number saved in the embedded system, it can be ensured that the embedded system can only be operated with an individual activation code. Therefore, a copy of the module for duplication is pointless. In the system, activation code monitoring means 161 can be provided, which are able to perform a monitoring or comparison of activation codes with a database and, if necessary, can emit an activation code warning signal if no match of the activation code or codes occurs or can emit an activation code approval signal if a match of the activation code or codes occurs.

Security During Image and Data Transmission

Optionally, the image data streams can be secured via the network with an AES encryption method, whereby the data is protected from an attacker in the transmission path. This concerns data transmission via Internet as well as internal transmission, for example in a casino.

High stability and safeguard against failure during image data transmission and display. By the utilisation of two independent real time capable computing components a high operating safety with high output reserves is realised.

Stability by Independence

By means of the independence of the embedded system from a PC control, the stability of the overall application is increased. In case of a failure of a part of the overall system, the embedded systems continue to function independently.

Network Security by a Hardware Firewall

By use of a hardware firewall the unauthorised access from outside via not permitted ports, not activated IP addresses, or not authorised Mac addresses can be prevented. Moreover, the logging allows a recording of permitted and non-permitted accesses. By utilisation of a hardware firewall, the firewall cannot let accidentally, in case of capacity overload, not permitted packages pass, as is the case for software-implemented firewalls.

Numerous modifications and developments of the described embodiments are realisable. For instance, an embedded system according to the present invention can also be used without a network, wherein it provides the server and client functionality simultaneously. Furthermore, different coding and encryption standards or methods can be utilised, and also according to the desired area of application, different interfaces, network protocols and network architectures can be used without changing the essence of the invention.

GLOSSARY

Image data stream, audio data stream, video data stream, combined data stream We consider these terms to mean data streams with a respective channel of the respective content (images, audio, video). A combined data stream contains image as well as audio data. Therefore, a video data stream can be an image data stream or a combined data stream.

Client/Server

We consider the terms client and server to mean so-called streaming clients or streaming servers. The term streaming client designates a special client for streaming media, which can be either software or hardware. Typical streaming clients support special streaming protocols such as RTP, RTCP, and/or RSVP. The term streaming server designates a decided server for distribution of streaming media data via a network. Typical streaming servers support special streaming protocols such as RTP, RTSP, RTCP, and RSVP (auxiliary protocol for QoS-method IntServ). Thereby, the term streaming media designates from a computer network received and simultaneously played audio and video data. The process of data transmission itself is termed streaming, and transmitted ("streamed") programmes are termed live stream or shortly stream.

(According to http://de.wikipedia.org/wiki/Streaming-Client, http://de.wikipedia.org/wiki/Streaming-Server and http://de.wikipedia.org/wiki/Streaming_Media)

Embedded System

The term embedded system (Eng. embedded system) describes an electronic data processor or computer, which is embedded (embedded) into a technical context. Thereby, the data processor assumes either monitoring, control, or regulatory functions or is responsible for a form of data or signal processing, for example during encryption or decryption, encoding or decoding, or filtering.

(Cited according to http://de.wikipedia.org/wiki/Eingebettetes_System)

Hardware Means

We consider the term hardware means to mean electronic components, which are optimised for certain purposes and execute their function mainly in real time. Typically, DSP, programmable hardware such as FPGAs, special ASICs (application-specific integrated circuit), or combinations thereof are used for such purposes. These can also contain embedded microprocessors (i.e. ARM processors). In the context of this application the term hardware means does not comprise multi-purpose microprocessors, which are not optimised for the purposes named herein. Multi-purpose microprocessors (i.e. by Intel or AMD) are typically found in personal computer as central processing units.

DSP

A digital signal processor or DSP serves the purpose of continuous processing of digital signals (i.e. audio or video signals). For processing of analogue signals, the DSP is used in conjunction with analogue-digital converters and digital-analogue converters. Compared to multi-purpose microprocessors DSPs contain a processor, which is speed-optimised for frequently required mathematical operations. Some DSPs already contain the necessary A/D and D/A converters at their input and output.

(Cited according to http://de.wikipedia.org/wiki/Digitaler_Signalprozessor)

A field programmable gate array or FPGA is an integrated circuit, into which a logic circuit can be programmed.

However, the term programming in this context is to be distinguished from the term describing the design of software for a conventional processor: In a FPGA circuit structures are generated by means of hardware description languages or in the form of wiring diagrams and these data are transmitted into the component for configuration. Thereby, certain switch positions are activated or deactivated, resulting in a concretely implemented digital circuit. Therefore, instead of the term programming the term configuration of a FPGA is also used. By the specific configuration of internal structures different circuits can be realised in a FPGA, culminating in highly complex structures, such as i.e. microprocessors.

The configuration typically takes place once before each use, whereby the FPGA is configured for a specific function, which it loses again upon switching off of the operating voltage. Therefore, a non-volatile memory, which stores the configuration, whose content on itself is also updatable, is allocated to the FPGA in most cases.

(according to http://de.wikipedia.org/wiki/Fpga)

Ethernet, GigE

Ethernet is a technology, which specifies software (protocols etc.) and hardware (cables, splitters, network cards etc.) for tethered data networks. It facilitates data exchange in the form of data packages between the devices connected to a local network (LAN).

Firewall

A firewall is a security system, which protects a network or a single computer from unwanted network accesses. The firewall serves to restrict the network access based on sender or destination address and used services. It monitors data traffic and decides according to specified rules, where certain network packages can pass through or not. The simple filtering of data packages according to network addresses is the basic function of all firewalls.

HD

This abbreviation stands for "high definition", (Eng.) wherein in our case image resolutions of 1280×720 or 1920×1080 pixels are meant, wherein the higher resolution is also termed "full HD".

Video resolution comprises the same parameters as image resolution (lines and columns or pixel number, aspect ratio) and extends these by the temporal aspect of frame rate. Thereby, it has to be differentiated between the repetition of partial (mostly half images with interlaced scanning, interlaced), and full images (frames, progressive scan). Common frame repetition rates are 24, 25, 50, or 60 Hz. In the HDTV area 720p and 1080i are common. One speaks of full HD from 1080p25, which means 1920×1080 pixels, progressive, 25 Hz. (According to http://de.wikipedia.org/wiki/Videoauflösung, http://de.wikipedia.org/wiki/Full_HD and http://de.wikipedia.org/wiki/High_Definition_Television)

Video

We consider video to mean moved images or image streams, with or without sound.

Interlaced Scanning, Progressive Scan

Interlaced scanning serves to reduce flicker in television engineering. It was developed with the intention to display signals flicker free with a minimal bandwidth. Thereby, a complete image (frame) is constructed from two different half images.

The progressive scan (Eng. progressive scan) designates a technique in image construction, wherein the output device—in contrast to interlaced scanning—does not receive line interlaced half images, but real full images.

(Cited according to http://de.wikipedia.org/wiki/Zeilensprungverfahren and http://de.wikipedia.org/wiki/Vollbildverfahren)

The invention claimed is:

1. An embedded system for video processing with hardware for realizing the following functions in a betting agency comprising:
 a) a server function, wherein for realizing the server function the following functions are realized:
  a1) receiving of at least one data stream pertaining to betting, the at least one data stream having information content selected from the group consisting of: dynamic live betting odds, game statistics, and parallel TV live broadcasts of several sports events;
  a2) compression of each of the at least one data stream yielding in each case a combined data stream;

a3) output of each of the combined data stream via a protocol based network;
b) a client function, wherein for realizing the client function the following functions are realized:
b1) receiving of at least one combined data stream from the protocol based network pertaining to the betting;
b2) decompression of the at least one combined data stream;
b3) output of the at least one combined data stream displayed in any order on one or several monitors;
c) wherein the hardware is adapted to compress and decompress a continuous combined data stream;
d) the hardware for realizing the server function and the client function are arranged on a joint circuit board;
e) hardware for accepting more than one combined data stream via the protocol based network;
f) hardware for decompression of more than one combined data stream;
hardware for scaling and/or rotating and/or merging and/or cross-fading of more than one decompressed image and audio data stream;
g) hardware for joint output of more than one decompressed image and audio data stream for simultaneous display on a monitor; and
h) hardware for separate output of one or more combined data streams on at least two monitors, which are arranged as a video wall;
wherein the compression and decompression of the continuous combined data stream is designed in such a way that they conduct an individual security with a hardware serial number and an individual activation code, and
comprise activation code monitoring means adapted to emit an activation code warning signal or an activation code approval signal, which conduct a monitoring and comparison of activation codes.

2. The embedded system according to claim 1 wherein the joint circuit board is designed as a PC plug-in card and is displayable in a PC operating system environment as a network card.

3. The embedded system according to claim 1 wherein the hardware adapted to compress and decompress the continuous combined data stream pertaining to the betting generates a continuous image- and audio-data stream with at least 60 frames per second and a resolution of at least 1920×1080 pixels without data jam.

4. The embedded system according to claim 1 wherein the compression of the data streams is carried out according to the H.264 or the H.265 standard.

5. The embedded system according to claim 1 wherein the server function realizes a function for encrypting the combined data stream; and
the client function realizes a function for decrypting the at least one combined data stream.

6. The embedded system according to claim 1 wherein the hardware adapted to compress and decompress the continuous combined data stream is adapted for converting an image data stream, which has been recorded by interlaced scanning, into progressive scanning.

7. The embedded system according to claim 1 further comprising:
a storage module with a BIOS;
a storage module with an operating system; and
means for receiving control signals via the protocol based network.

8. The embedded system according to claim 1 further comprising an output of control signals for remote control of connected devices.

9. The embedded system according to claim 1 further comprising
hardware for intermediate storage and repeated output of the at least one combined data stream; and
an interactive control of the embedded system by the observer of the at least one outputted data stream.

10. The embedded system according to claim 1 wherein the hardware adapted to compress and decompress the continuous combined data stream pertaining to the betting further comprises a Field Programmable Gate Array (FGPA), wherein the following functions are provided by the FPGA:
connection to the protocol based network;
firewall;
encryption of the combined data stream to be output, if the embedded system operates as a server; and
decryption of the at least one combined data stream, if the embedded system operates as a client.

11. The embedded system according to claim 10 wherein the configuration of the FPGA is individually encrypted.

12. The embedded system according to claim 1 wherein the hardware adapted to compress and decompress the continuous combined data stream pertaining to the betting further comprises digital signal processor (DSP), wherein the following functions are provided by means of the DSP:
compression of at least one of the image- and audio-data streams yielding in each case a combined data stream, if the embedded system operates as a server;
decompression of the at least one combined data stream, if the embedded system operates as a client; and
scaling and output of the decompressed image- and audio-data stream via an interface, if the embedded system operates as a client.

13. The embedded system according to claim 1 further comprising:
at least one network connection, and
at least one interface according to a video standard, and/or
at least one interface according to an audio standard, and/or
at least one interface to a data bus and/or
an infrared interface.

14. A video distribution system for receiving and distributing of at least one video data stream pertaining to betting, the at least one of data stream having information content selected from the group consisting of: dynamic live betting odds, game statistics, and parallel TV live broadcasts of several sports events from at least one video source comprising:
a protocol based network;
an embedded system for video processing with hardware for realising the following functions in a betting agency comprising:
a) a server function, wherein for realizing the server function the following functions are realized:
a1) receiving of at least one data stream pertaining to betting, the at least one data stream having information content selected from the group consisting of: dynamic live betting odds, game statistics, and parallel TV live broadcasts of several sports events;
a2) compression of each of the at least one data stream yielding in each case a combined data stream;
a3) output of each of the combined data stream via a protocol based network;

b) a client function, wherein for realising the client function the following functions are realized:
- b1) receiving of at least one combined data stream from the protocol based network pertaining to the betting;
- b2) decompression of the at least one combined data stream;
- b3) output of the at least one combined data stream displayed in any order on one or several monitors;

c) wherein the hardware is adapted to compress and decompress a continuous combined data stream;

d) the hardware for realising the server function and the client function are arranged on a joint circuit board;

e) hardware for accepting more than one combined data stream via the protocol based network;

f) hardware for decompression of more than one combined data stream;

hardware for scaling and/or rotating and/or merging and/or cross-fading of more than one decompressed image and audio data stream;

g) hardware for joint output of more than one decompressed image and audio data stream for simultaneous display on a monitor; and h) hardware for separate output of one or more combined data streams on at least two monitors, which are arranged as a video wall;

wherein the compression and decompression of the continuous combined data stream is designed in such a way that they conduct an individual security with a hardware serial number and an individual activation code, and comprise activation code monitoring means adapted to emit an activation code warning signal or an activation code approval signal, which conduct a monitoring and comparison of activation codes wherein the embedded system receives and then compresses and outputs via the protocol based network at least one of the image data streams from the at least one video source; and wherein the embedded system also receives from the protocol based network at least one compressed data stream, which is decompressed and outputted via an interface.

15. The video distribution system according to claim 14, wherein satellite television receivers, or cable television connections, or DVBT receivers, or PCs or media players are used as the at least one video source; and to the interface of the embedded system, which is operating as a client, by which the at least one decompressed data stream is outputted, monitors are connected.

* * * * *